Dec. 20, 1927.

T. H. THOMAS 1,653,134

ELECTROPNEUMATIC BRAKE

Filed Feb. 23, 1927

INVENTOR
THOMAS H. THOMAS
BY *Wm. M. Cady*
ATTORNEY

Patented Dec. 20, 1927.

1,653,134

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed February 23, 1927. Serial No. 170,073.

This invention relates to electro-pneumatic brakes and has for its principal object to provide an electro-pneumatic brake system in which the application and release of the brakes are controlled through a single train wire.

Figure 1:
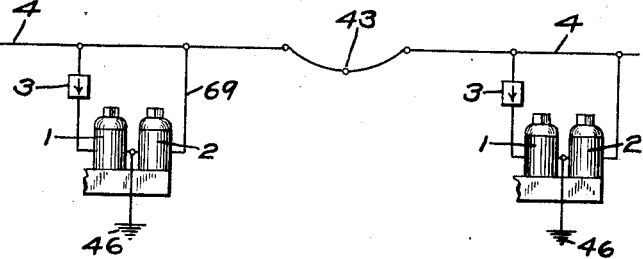

In the accompanying drawing; Fig. 1 is a diagrammatic view of an electro-pneumatic brake system embodying my invention, as applied to a locomotive and one car; and Fig. 2, a view, partly in section, of the electro-pneumatic brake equipment employed on the locomotive and on each car.

Figure 2:
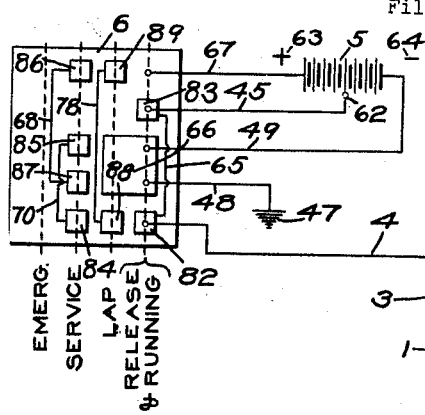
Figure 2:
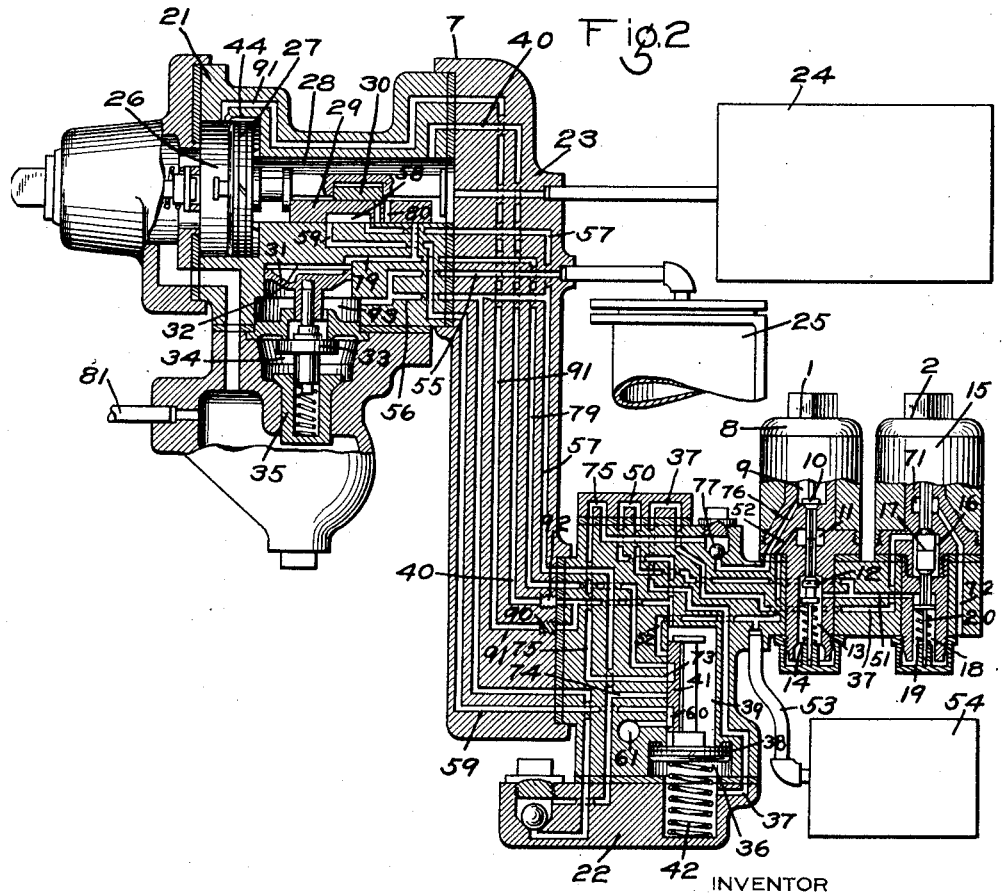

As shown in Fig. 1 of the drawings, the locomotive and each car is provided with a magnet valve device 1, a magnet valve device 2, a rectifier 3 interposed in the circuit of the magnet valve device 1 and adapted to permit flow of current only in one direction, said magnet valve device being connected in parallel with the single train wire 4. On the locomotive is provided a battery or other source of power 5, and a brake switch 6. The locomotive and each car is equipped with an electro-pneumatic brake equipment 7, as shown in Fig. 2 of the drawing, and comprising the magnet valve devices 1 and 2, a triple valve device 21 and a selector valve device 22.

The magnet valve device 1 comprises a magnet 8 and a casing having a chamber 9 containing a valve 10, the fluted stem of which extends through a bore in the casing and engages, in chamber 11, the fluted stem of a valve 12 contained in chamber 13. The valves 10 and 12 are adapted to be operated in one direction by operation of the magnet 8 and when said magnet is deenergized the pressure of spring 14 shifts the valves in the opposite direction.

The magnet valve device 2 comprises a magnet 15, and a casing having a chamber 16 containing a double beat valve 17, adapted to be operated by said magnet, and a chamber 18, containing a coil spring 19 adapted to engage a collared stem 20, abutting the valve stem.

The magnet valve devices are so constructed that a lower voltage will operate the magnet 8 than is required to operate the magnet 15.

The rectifier 3 is disposed in the circuit of the magnet valve device 1 and is adapted to permit the flow of current only in one direction, as indicated by the arrow on each rectifier.

The brake switch 6, located on the locomotive, may comprise a contact drum adapted to be operated by a handle; the rotation of said drum being adapted to effect the electrical connections in the various positions of the brake switch, as shown in the development of said switch.

The electro-pneumatic brake equipment 7 is similar to that disclosed in my prior Patent No. 1,440,421, issued on January 2, 1923, and may comprise a quick action triple valve device 21, and a selector valve portion 22, both of which are mounted on a bracket 23, to which the auxiliary reservoir 24 and brake cylinder 25 are also connected. Mounted on a bracket integral with the selector valve portion are the magnet valve devices 1 and 2.

The triple valve device 21 may comprise the usual casing having a piston chamber 26 connected to the brake pipe 81 and containing a piston 27, and a valve chamber 28 connected to the auxiliary reservoir 24 and containing a main slide valve 29 and an auxiliary slide valve 30, adapted to be operated by said piston.

The quick action portion of the triple valve device may comprise the usual piston 31 contained in chamber 32, and adapted to operate the brake pipe vent valve 33 contained in chamber 34. Also contained in chamber 34 is the usual check valve 35.

The selector valve portion 22 comprises a casing having a piston chamber 36 connected through passage 37 to chamber 16 of the magnet valve device 2, and containing a piston 38, and a valve chamber 39 connected through passage 40 to valve chamber 28 of the triple valve device, and containing a slide valve 41, adapted to be operated by said piston. A coil spring 42, contained in piston chamber 36, acts on the face of the piston 38.

The single train wire 4 is continuous throughout the train, being connected between cars by a jumper 43.

The brake switch 6 is separable from the usual automatic brake valve device (not shown) and is adapted to be operated independently, while the automatic brake valve device remains in the usual running position.

In operation, the fluid pressure brake system is charged in the usual manner, and fluid from the brake pipe 81 flows to piston chamber 26 of the triple valve device and thence through the feed groove 44 to valve chamber 28 and the auxiliary reservoir 24. Fluid from the valve chamber 28 is supplied through passage 40 to the selector valve chamber 32 and from passage 40 through passages 50 and 51 to valve chambers 13 and 18 of the magnet valve devices 1 and 2.

In the combined release and running position of the brake switch, the train wire 4 circuit is closed through a portion of the battery 5 by way of drum contact 82, wire 65, drum contact 83, wire 45 connected to an intermediate point 62 of the battery, thence to the negative pole 64 of the battery, wire 49, drum contact 66, wire 48, and ground 47.

The current thus supplied from a portion of the battery 5 flows through the train wire 4 to the magnet 8 through the rectifier 3 and through wires 69 to magnet 15, and thence to the common ground 46. This current is not sufficient to effectively energize the magnet 15, but the magnet 8 is energized by the current.

The magnet 15 not being effectively energized, the double beat valve 17 is seated in its upper position, as shown in the drawing, in which position fluid at brake pipe pressure from chamber 18 is permitted to flow through passage 37 to the selector piston chamber 36. The pressures on the opposite sides of the selector piston 38 therefore become equalized and the pressure of spring 42 holds said piston and the slide valve 41 in the release position, as shown in the drawing. The magnet 8 being energized, the valve 10 is seated and the valve 12 is unseated, which permits fluid at brake pipe pressure from chamber 13 to flow into chamber 11 and thence through passage 52 and pipe 50 to a reservoir 54. Passage 52 also leads to the seat of the selector slide valve 41, but is lapped in the release position of the slide valve.

With the selector piston 38 and slide valve 41 in release position, and with the triple valve device 21 in release position, the brake cylinder 25 is connected to the atmosphere through passages 55, 56, 57, cavity 58 in the triple valve slide valve 29, passage 59, cavity 60 in the selector slide valve 40 and the atmospheric exhaust passage 61.

To effect a service application of the brakes, the brake switch 6 is moved, independently of the usual automatic brake valve device (not shown), to service position, in which the train wire 4 circuit is closed through the whole battery 5 by way of drum contact 84, wire 70, contact 85, wire 49, negative pole 64 of the battery 5, through the battery to the positive pole 63 of the battery 5, wire 67, contact 86, wire 68, contact 87, wire 48 and ground 47.

It will be noted that current flows through the train wire 4 in the opposite direction from the flow when the brake switch is in release position, and since the rectifier 3 prevents flow in this direction, current is only supplied through wire 69 to magnet 15 which becomes energized while the magnet 8 is deenergized.

The magnet 15 being energized, it operates to shift the double beat valve 17 to its lower position, in which communication between chambers 16 and 18 is closed, and chamber 16, which is connected through passage 37 to the selector piston chamber 36, is connected to chamber 71 and thence to the atmosphere through the exhaust passage 72. Fluid under pressure is thus vented from the piston chamber 36 and the opposing pressure in the valve chamber 39 then shifts the piston 38 and slide valve 41 downwardly to application position against the pressure of spring 42.

With the selector valve in application position, communication between the brake cylinder passage 59 and the exhaust passage 61, is cut off, and the brake cylinder passage 59 is lapped. The passage 52 is connected to the valve chamber 39 and cavity 73 in the slide valve connects passage 74 to passage 75.

The magnet 8 being deenergized, the pressure of spring 14 closes the valve 12 and opens the valve 10, which permits the flow of fluid under pressure from chamber 11, connected to the reservoir 54 and selector valve chamber 39, to chamber 9 and thence through passage 76, past the check valve 77, through passage 75, cavity 73 in the selector slide valve, passages 74, 57, 56 and 55 to the brake cylinder 25, thereby applying the brakes.

The selector valve chamber 39 being connected through passage 40 to the triple valve slide valve chamber 28, the pressure of the fluid in the valve chamber 39 and reservoir 54 is maintained from the auxiliary reservoir 24 when applying the brakes.

If it is desired to limit the brake cylinder pressure to some particular degree, the brake switch 6 is moved to lap position, when the desired pressure is attained in the brake cylinder.

In lap position of the brake switch 6, the train wire 4 circuit is closed through the whole battery 5 by way of drum contact 88, wire 78, drum contact 89, wire 67, the positive pole 63 of the battery 5 through the battery to the negative pole 64, of the battery 5, wire 49, drum contact 66, wire 48 and ground 47.

In lap position, the current thus flows from the positive pole 63 of the whole battery to the train wire 4 and thence through the rectifier 3 and magnet valve device 1 and wire 69 and the magnet valve device 2 to the ground 46. The energization of the magnet 15 is thus retained the same as in service position, and in addition the magnet 8 is also energized.

The magnet 8 being energized, operates to close the valve 10 and prevent further flow of fluid under pressure from chamber 11 to chamber 9 and thence to the brake cylinder 25. By alternately moving the brake switch between service and lap positions, as described, the brake cylinder pressure may be increased in steps up to the degree at which the brake cylinder pressure becomes equal to the pressure of the fluid in the brake pipe.

To release the brakes, the brake switch 6 is moved to the combined running and release position in which the magnet 8 becomes energized and the magnet 15 becomes deenergized, as herein before described. Energization of the magnet 8 operates to prevent flow of fluid to the brake cylinder, while deenergization of the magnet 15 permits the balancing of fluid pressures on the opposite sides of the selector piston, with a consequent shifting of said piston and slide valve 41 to release position, by the pressure of the spring 42. In release position of the selector slide valve 41, passage 59 from the brake cylinder 25 is connected through cavity 60 in the slide valve to the exhaust passage 61, thereby permitting the venting of fluid from the brake cylinder 25, with a consequent release of the brakes.

If it is desired to limit the venting of brake cylinder pressure, the brake switch 6 is moved to lap position after the desired decrease in brake cylinder pressure is obtained, in which position further change in brake cylinder pressure is prevented. By alternately moving the brake switch between release and lap positions, as described, a graduated release of the brakes is effected.

To effect an emergency application of the brakes, the brake switch 6 is moved to emergency position, in which position the circuit in the train wire 4 is opened, so that both of the magnets 8 and 15 are deenergized.

Since the magnet 15 is deenergized, the selector valve piston 38 will be maintained in release position, the supply of fluid under pressure to the piston chamber 36 being maintained from chamber 18 past the open double beat valve 17.

The magnet 8 being deenergized, the valve 12 will be closed and the valve 10 opened, so that fluid under pressure is supplied from the normally charged reservoir 54 to the quick action piston 31, in the triple valve device, through pipe 53, passage 52, past the open valve 10, through passage 76, past the check valve 77, through passage 75, cavity 73 in the selector slide valve 41 and passage 79.

The quick action piston then operates to open the brake pipe vent valve 33 and connect chamber 34 to chamber 93, which is connected through passage 55 to the brake cylinder 25. The fluid under pressure in the brake pipe then lifts the check valve 35 and flows through the chambers 34 and 93 to the brake cylinder, thereby effecting a local reduction in the brake pipe pressure, in the usual manner.

Said reduction in brake pipe pressure causes the triple valve piston 27 to shift the slide valves 29 and 30 to emergency position, in which fluid under presure in the auxiliary reservoir 24 and valve chamber 28 is permitted to flow through port 80 in the main slide valve and into passage 57 and thence through passages 56 and 55 to the brake cylinder 25, and thus apply the brakes in emergency.

When an emergency application of the brakes is effected in the above described manner, the continued flow of fluid under pressure in the brake pipe 81 will be cut off at the locomotive by movement of the automatic brake valve device (not shown) to emergency or lap position.

If the train current should fail, an emergency application of the brakes will be effected in the same manner as when the brake switch is moved to emergency position.

If a car equipped with the above described apparatus is placed in a train not provided with electric control, the magnets 8 and 15 will both be deenergized. The double beat valve 17 will therefore be in its upper position, in which it will permit an equalization of pressures on the selector valve piston, so that said piston will remain in its release position. The valve 12 controlled by magnet 15 will be closed, so that brake pipe fluid cannot flow into chamber 11, so that with the valve 10, open, the chamber 11 and reservoir 54 will be connected to the quick action piston 31 and thence to the brake cylinder passage 56 to the atmosphere in the usual manner. Since there is no fluid in the reservoir 54 under the above conditions, there will be no action of the electric portion, and the equipment will only act pneumatically, as controlled by the automatic brake valve device on the locomotive.

If it is desired to operate the brakes pneumatically at the same time as electrically, a plug 90 in a passage 91 is removed and placed in the threaded opening 92 in the passage 40, so as to close the auxiliary reservoir passage 40 and open the brake pipe passage 91.

With this arrangement, it will be seen that upon the combined operation of the pneumatic brake valve and electric brake switch, fluid under pressure will be taken from the brake pipe by way of passage 91, instead of from the auxiliary reservoir through passage 40, to effect an application of the brakes electrically. This insures that the auxiliary reservoir pressure will be higher than the brake pipe pressure, which is reduced at the brake valve device as well as through operation of the electric equipment in service position, so that the triple valve devices will operate to move to service position and apply the brakes.

As hereinbefore explained, when an electric service application of the brakes is effected, the fluid for applying the brakes is taken from the auxiliary reservoir through passage 40. The auxiliary reservoir pressure therefore tends to be reduced, but is substantially maintained by flow from the brake pipe 81 through the feed groove 44 around the piston 27, on account of the usual automatic brake valve device on the locomotive remaining in running position, in which the brake pipe pressure is maintained.

On account of the brake pipe and auxiliary reservoir pressures being maintained during electric operation, the ability to obtain a brake application whenever and as often as desired is assured, and furthermore, a supply of fluid is always insured for securing an emergency application of the brakes.

Having now described my invention, what I claim as new and desire to secure by Letters Patent, is:—

1. In an electrically controlled brake, the combination with a single train wire, of two electrically controlled devices connected to said wire for controlling the brakes, one effectively energizable by current at a strength which will not effectively energize the other device, and means for preventing flow of current through one of the devices in one direction.

2. In an electrically controlled brake, the combination with a single train wire, of two electrically controlled devices connected to said wire for controlling the brakes, one device being effectively energized by current at a strength which will not effectively energize the other device, and means for preventing flow of current through the first mentioned device in one direction.

3. In an electrically controlled brake, the combination with a single train wire, of means for impressing a current on said wire at one current strength in one direction at one time and a current at a different current strength in the opposite direction at another time, and electrically controlled means connected to said train wire and controlled according to the direction and strength of current flowing through said wire.

4. In an electrically controlled brake, the combination with a single train wire, of means for supplying current to said wire in one direction at one current strength at one time, at another current strength at any time, and for supplying current to said wire in the reverse direction at another time, and electrically controlled means operated according to the strength and direction of current through said wire for controlling the brakes.

5. In an electrically controlled brake, the combination with a single train wire, of two electrically controlled devices connected to said wire for controlling the brakes, means in circuit with one device for permitting flow of current through said device only in one direction and effectively energized by current at a strength insufficient to effectively energize the other device.

6. In an electrically controlled brake, the combination with a single train wire, of two electrically controlled devices connected to said wire for controlling the brakes, means in circuit with one device for permitting flow of current through said device only in one direction and effectively energized by current at a strength insufficient to effectively energize the other device, and means for supplying current at the different strengths to said train wire.

7. In an electrically controlled brake, the combination with a single train wire, of a brake switch device having a release position in which current at one current strength and flowing in one direction is supplied to said train wire, and a brake application position, in which current is supplied to said train wire at a different current strength, and flowing in the reverse direction, and electrically controlled devices connected to said train wire and controlled according to the direction and strength of current in said wire for controlling the application and release of the brakes.

8. In an electrically controlled brake, the combination with a single train wire, of a brake switch device having a release position in which current at one current strength and flowing in one direction is supplied to said train wire, a brake application position, in which current is supplied to said train wire at a different current strength and flowing in the reverse direction, and a lap position, in which the direction of current flow is the same as in release position, and the strength of current is the same as that in service position, and means operated according to variations in the direction of flow and strength of current for controlling the brakes.

9. In an electrically controlled brake, the combination with a single train wire, of two electrically controlled devices connected to said train wire for controlling the brakes and means whereby current supplied to said train wire will energize one device to effect the release of the brakes, energize the other device to effect an application of the brakes, and energize both devices to hold the brakes applied or released.

10. In an electrically controlled brake, the combination with a single train wire, of two electrically controlled devices connected to said train wire for controlling the brakes and means whereby current supplied to said train wire will energize one device to effect the release of the brakes, energize the other device to effect an application of the brakes, and energize both devices to hold the brakes applied or released, the brakes being also applied upon deenergization of both devices.

In testimony whereof I have hereunto set my hand.

THOMAS H. THOMAS.